US010914875B1

(12) United States Patent
Raymond et al.

(10) Patent No.: US 10,914,875 B1
(45) Date of Patent: Feb. 9, 2021

(54) MULTI-FACETED DIFFUSER PROVIDING SPECIFIC LIGHT DISTRIBUTIONS FROM A LIGHT SOURCE

(71) Applicant: Lumenco, LLC, Englewood, CO (US)

(72) Inventors: Mark A. Raymond, Littleton, CO (US); Hector Andres Porras Soto, Littleton, CO (US); Howard Lange, San Diego, CA (US)

(73) Assignee: Lumenco, LLC, Englewood, CO (US)

( * ) Notice: Subject to any disclaimer, the term of this patent is extended or adjusted under 35 U.S.C. 154(b) by 0 days.

(21) Appl. No.: 16/894,489

(22) Filed: Jun. 5, 2020

Related U.S. Application Data

(60) Provisional application No. 62/880,776, filed on Jul. 31, 2019.

(51) Int. Cl.
*G02B 5/02* (2006.01)
*F21V 8/00* (2006.01)

(52) U.S. Cl.
CPC ......... *G02B 5/0221* (2013.01); *G02B 5/0231* (2013.01); *G02B 5/0242* (2013.01); *G02B 5/0263* (2013.01); *G02B 5/0278* (2013.01); *G02B 5/0284* (2013.01); *G02B 6/0051* (2013.01)

(58) Field of Classification Search
None
See application file for complete search history.

(56) References Cited

U.S. PATENT DOCUMENTS

| 6,456,437 B1 | 9/2002 | Lea et al. | |
| 2014/0022783 A1* | 1/2014 | Rinehart | F21V 3/049 362/235 |
| 2019/0369297 A1* | 12/2019 | Arima | F21V 3/00 |

FOREIGN PATENT DOCUMENTS

| WO | 2011143015 A1 | 11/2011 |
| WO | 2018130926 A1 | 7/2018 |

OTHER PUBLICATIONS

International Search Report & Written Opinion, for Application No. PCT/US2020/041390, dated Oct. 1, 2020.

* cited by examiner

*Primary Examiner* — Derek S. Chapel
(74) *Attorney, Agent, or Firm* — Snell & Wilmer L.L.P.; Kent A. Lembke

(57) ABSTRACT

Optical or light diffusers (or, simply, "diffusers") designed and manufactured to include numerous facets arranged in cells or sets in which the planar faces or outward-facing surfaces have orientations and transmission angles (as may be defined by direction cosines of normal) to redirect received light to a region or portion of a predefined light distribution. A method of designing or defining the facets of the diffuser is also provides as are methods of manufacturing the diffusers and apparatus or products that include the new diffusers (such as microdisplays and lighting components). The diffusers are optically designed to produce a user-specified distribution of light. The diffusers can be engineered through the configuration of the facets on its front or outer surface (light transmission surface) to produce nearly any type of light distribution or shape, and the diffuser design facilitates their manufacture using extrusion processes as well as other fabrication techniques.

32 Claims, 12 Drawing Sheets

```
YodaDiffuser 1.017 8-10-2018
TodaysDate    8/12/2018
Units Used  Microns

********************     Information YodaDiffuser     *************************
Data Input File Name C:\Users\Howard2015\Visual
Basic\Optics\YodaDiffuser\Data1\DataYodaDiffuser1.txt
Facets are Randomly Generated
Brightness Specified Half Angles in X and Y    30     8
Type of Fall Off  Linear
Source is Collimated
Array Size X and Y    40000    40000
Facet Size X and Y    12    12
Index of Refraction of Facets   1.5
Specified MaxTilt Angle ( Deg.)    42
GenerationMethod    GenerateFacets2
Total Theoretical Facets    11111111
Numbe of Generated Facets    11111095
Total Numbe of Plotted Facets    11111095
TIR for Collimated Light, Facet Angle (Deg.)   41.81
Maximum Deflection Angle before TIR occurs ( Deg.) 48.19
Design normalized to center 1
Numbe of User Brightness Cells in X and Y    7    7
Angular Spread in Cells X  Y Deg.    4  1.0666
HardCodeUsed    DesignHardCode8 X 30 DegreesFWHM
*****  Numbe of Rays Assigned to EachCell  *****

\*\*\*\*\*\*\*\*\*\*\*\*\*\*\*\*\*\*\*\*\*\*\*\*\*\*\*\*   VendorInformation
\*\*\*\*\*\*\*\*\*\*\*\*\*\*\*\*\*\*\*\*\*\*\*\*\*\*\*\*\*\*\*\*\*\*\*\*\*\*\*\*
Units   Microns
Overall Array Size X and Y    40000    40000
Facet Size X and Y    12    12
Maximum Facet Angle Specified    42
Maximum Facet Angle Found ( Deg. )   38.32
Location of MaxTilt   X =    19092   Y =    4368
Peak to Valley at this location    10.524

| | | | | | | | | | | | | | | | | | | | |
|---|---|---|---|---|---|---|---|---|---|---|---|---|---|---|---|---|---|---|---|
| 0 | 0 | 0 | 0 | 0 | 0 | 139.259 | 279.259 | 139.259 | | | | | | | | | | | |
| 0 | 0 | 0 | 0 | 835.555 | 3481.48 | 6266.664 | 7380.737 | 6266.664 | 3481.48 | 835.555 | | | | | | | | | |
| 0 | 0 | 0 | 2785.184 | 9887.403 | 18103.69 | 24509.61 | 26877.02 | 24509.61 | 18103.69 | 9887.403 | 2785.184 | 0 | 0 | 0 | | | | | |
| 0 | 0 | 2785.184 | 12811.84 | 26877.02 | 40942.20 | 51108.12 | 54868.12 | 51108.12 | 40942.20 | 26877.02 | 12811.84 | 2785.184 | 0 | 0 | | | | | |
| 0 | 835.555 | 9887.403 | 26877.02 | 47626.64 | 66983.67 | 80770.33 | 85644.40 | 80770.33 | 66983.67 | 47626.64 | 26877.02 | 9887.403 | 835.555 | 0 | | | | | |
| 0 | 3481.48 | 18103.69 | 40942.20 | 66983.67 | 90796.99 | 107368.8 | 113356.9 | 107368.8 | 90796.99 | 66983.67 | 40942.20 | 18103.69 | 3481.48 | 0 | | | | | |
| 139.259 | 6266.664 | 24509.61 | 51108.12 | 80770.33 | 107368.8 | 125890.3 | 132435.4 | 125890.3 | 107368.8 | 80770.33 | 51108.12 | 24509.61 | 6266.664 | 139.259 | | | | | |
| 279.259 | 7380.737 | 26877.02 | 54868.12 | 85644.40 | 113356.9 | 132435.4 | 139259.1 | 132435.4 | 113356.9 | 85644.40 | 54868.12 | 26877.02 | 7380.737 | 279.259 | | | | | |
| 139.259 | 6266.664 | 24509.61 | 51108.12 | 80770.33 | 107368.8 | 125890.3 | 132435.4 | 125890.3 | 107368.8 | 80770.33 | 51108.12 | 24509.61 | 6266.664 | 139.259 | | | | | |
| 0 | 3481.48 | 18103.69 | 40942.20 | 66983.67 | 90796.99 | 107368.8 | 113356.9 | 107368.8 | 90796.99 | 66983.67 | 40942.20 | 18103.69 | 3481.48 | 0 | | | | | |
| 0 | 835.555 | 9887.403 | 26877.02 | 47626.64 | 66983.67 | 80770.33 | 85644.40 | 80770.33 | 66983.67 | 47626.64 | 26877.02 | 9887.403 | 835.555 | 0 | | | | | |
| 0 | 0 | 2785.184 | 12811.84 | 26877.02 | 40942.20 | 51108.12 | 54868.12 | 51108.12 | 40942.20 | 26877.02 | 12811.84 | 2785.184 | 0 | 0 | | | | | |
| 0 | 0 | 0 | 2785.184 | 9887.403 | 18103.69 | 24509.61 | 26877.02 | 24509.61 | 18103.69 | 9887.403 | 2785.184 | 0 | 0 | 0 | | | | | |
| 0 | 0 | 0 | 0 | 835.555 | 3481.48 | 6266.664 | 7380.737 | 6266.664 | 3481.48 | 835.555 | 0 | 0 | 0 | 0 | | | | | |
| 0 | 0 | 0 | 0 | 0 | 0 | 139.259 | 279.259 | 139.259 | 0 | 0 | 0 | 0 | 0 | 0 | | | | | |

FIG. 11

MULTI-FACETED DIFFUSER PROVIDING SPECIFIC LIGHT DISTRIBUTIONS FROM A LIGHT SOURCE

REFERENCE TO RELATED APPLICATIONS

This application claims priority to U.S. Provisional Patent Applicant No. 62/880,776, filed on Jul. 31, 2019, which is incorporated herein in its entirety by reference.

BACKGROUND

1. Field of the Description

The present description relates, in general, to, light transmission, projection, and use in illuminating displays and to related devices or products. More particularly, the present description relates to an optical diffuser designed to produce a specific or predefined light distribution in space through the use of numerous facets (or microstructures or lenses) aiming light in desired directions. The description also relates to the design and production method used to create the new optical diffusers as well as to apparatus (products or devices) that include or make use of the optical diffusers such as microdisplays (such as light emitting diode (LED) screens), lighting devices of many types (e.g., lights used in the automobile industry, indoor and outdoor lighting application, and the like), projection screens, and so on.

2. Relevant Background

There continues to be a large demand for optical diffusers (or light diffusers or, more simply, "diffusers") to diffuse or scatter light to transmit light in a desired manner such as to soften light or to spread light out so it does not appear to come from a point source. The demand for diffuse light or soft light will likely grow in the coming years due to the greater reliance on sources such as LEDs, lasers, and the like as light sources and due to the need for diffuse light in more and more devices that include microdisplays.

Diffuse light used in microdisplays, such as those in smartphones, compact computing and gaming devices, and the like, is often provided by compact optical systems with a diffuser formed of a translucent material such as ground glass, polyester films, polycarbonate substrates, opal glass, grayed glass, and the like. Conventional diffusers are made using light-scattering materials that produce a distribution of light in all directions and angles. These types of diffusers include those formed of opal or milk glasses and may also include diffusers formed of ground glass and sand blasting glass to create random surfaces to scatter transmitted light passing through the diffuser. While being useful for softening coherent or noncoherent light from a light source, these diffusers provide no control over angular light distribution or transmission, and the efficiencies of light transmission tend to be relatively low as these diffusers often produce total internal reflection (TIR).

Other types of diffusers have, as a result, been created to try to address the problems of hot spots and uneven light distribution associated with filament, arc, LED, fiberoptic, laser light sources, and other light sources. These alternative design diffusers have been relatively successful in smoothing and homogenizing sources while also providing uniform light in other applications such as for liquid crystal display (LCD) backlights, LED displays, machine vision, automotive lighting, viewing screens, and the like. Such diffusers may be made by rulings of cross-sectional shapes in a transparent material to distribute light mainly in a given XZ or YZ plane, but, in other cases, simple lenticular designs are used in the diffusers. Other more sophisticated diffusers, which may be called light-shaping diffusers, may use diffractive optical elements (DOEs) and may be used with a laser light source. These diffusers often use phase differences generated in a substrate to diffract light rays into certain directions with the DOEs, and the DOEs may be holographically recorded, randomized surface structures that can increase light transmission efficiency (e.g., to 80 percent or more), provide beam shaping, and homogenize output light.

While solving some issues with conventional diffusers, there are still a number of issues with use of even these more sophisticated optical diffusers. For example, one problem associated with highly-engineered holographic diffusers is that they are expensive and cumbersome to record. Another problem is that their structures (or DOEs) are so fine that they cannot be extruded, which is the preferred low-cost method of manufacture, as the material tends to "relax" in extrusion embossing due to the small size of the structures. Therefore, holographic diffusers are generally made in a ultraviolet (UV) cast and cure environment or process that is more expensive than extrusion. Another problem with holographic diffusers is that since the structures are so small (e.g., less than 5 microns) they are especially sensitive to dust, oils from user's hands, and so on that can render them useless or at least less efficient and less effective in desired scattering.

There remains a need for new light or optical diffusers that address these and other problems with existing diffusers. For the most part, diffusers are not engineered well and operate in a rather crude and inefficient manner by wasting light (e.g., low light transmission efficiencies) and not diffusing the light properly, which can leave hot spots. This is particularly true with LED diffusers and LED lighting. Since LEDs tend to provide very bright "spots" or points of light, they are difficult to diffuse and can create very hot areas or spots on the diffuser surface. In other cases, though, the diffusing provided by the LED diffuser is so "heavy" that it blocks most or a great deal of the light, and such low light transmission efficiency is undesirable in many applications such as for use in a display backlight. LED lighting is expected by many to nearly take over the lighting market due to energy efficiencies and general production costs associated with LED light sources, and it highly desirable to solve the problems associated with diffusing LED lighting in the very near future.

SUMMARY

Briefly, diffusers are described herein for use in providing a user-selected light distribution in space from a wide variety of light sources including LED light sources and coherent light sources without hotspots. The diffusers are designed using a new design method that is effective in processing a user's input or desired light distribution (such as a Gaussian or non-Gaussian distribution or engineered shapes such as a product logo, an image, letters, or the like) and defining facets or microstructures for a front or light transmission surface of the diffuser. These facets are randomly distributed across this front surface in sets or cells associated with various regions (or brightness levels) within the predefined light distribution, and the assignment process is performed to set the number of facets in each set to achieve the brightness level of that set or cell (e.g., cells with higher brightness levels are assigned a proportionally higher number of facets than ones with lower brightness levels). Further, the facets assigned to each region (e.g., an angular range of the distribution) are randomly directed to direct light within the region and not only at the center of such a region to avoid hotspots.

More particularly, an apparatus is provided for producing a predefined light distribution in space. The apparatus includes a light source operable to output light. The apparatus also includes a diffuser with a substrate having a back surface receiving the light output from the light source and a front surface, opposite the back surface, redirecting and transmitting the light received on the back surface to output diffuse light with the predefined light distribution from the diffuser. The substrate is formed of a light-transmissive material (such as a "clear" polycarbonate, PET, glass, ceramic, or the like). The front surface is formed so as to include a plurality of facets that scatter or redirect that light during its transmission through the front surface, thereby diffusing the source-provided light. Each of the plurality of facets is randomly assigned to one of a plurality of sets, and each of the plurality of sets is associated with a region of the predefined light distribution.

In some embodiments, each of the facets in each of the plurality of sets has a planar face oriented to redirect the light received on the back surface in a direction within the region of the predefined light distribution associated the one of the plurality of sets to which they are assigned. Further, each of the regions of the predefined light distribution is associated with an angular range and the direction within the region is randomly assigned to each of the facets (e.g., each facet of a set does not direct its light in exactly the same direction while still contributing to the brightness of that particular region or area of the light distribution shape). In some case, each of the facets is defined by a coordinates of the planar face on the front surface of the diffuser and by a normal vector direction to the planar face.

In the same or other embodiments, each of the sets of the facets is associated with a brightness cell defining the predefined light distribution. The number of the facets (or portion of available facets) assigned to each of the sets of the facets is selected based on a brightness value assigned to each of the brightness cells. In some cases, the predefined light distribution is a Gaussian distribution, while, in other cases, the predefined light distribution is a line focus, is an engineered shape, includes one or more letters, or includes one or more images. The light source may be a light emitting diode (LED) source, a coherent light source, a filament light source, a fluorescent light source, or a halogen light source.

In some preferred implementations, the apparatus further includes at least one additional optical element positioned to receive the output diffuse light, and the apparatus is adapted to function as a display, a projection screen, theater or film production lighting, automobile lighting, indoor or outdoor lighting, or a light curing unit. The diffuser for the apparatus may be formed via extrusion processes or cast and cure using ultraviolet (UV) or E beam curing of the facets.

BRIEF DESCRIPTION OF THE DRAWINGS

FIG. 4 illustrates a screenshot of a user input page or GUI provided to a user of the system of FIG. 3 by the diffuser design module showing a number of rays in each brightness cell;

FIGS. 5A and 5B illustrate a screenshot of contents of a header file showing data used and/or created by operations of a facet generation algorithm of the present description;

FIG. 10 is a screenshot of a GUI provided by the software described herein displaying brightness cells with values associated with a Gaussian-type distribution of light by a designed diffuser;

FIG. 11 illustrates a screenshot of a GUI provided by the design module of the present description displaying for a particular brightness distribution of a diffuser a total number of facets associated with or assigned to each brightness cell or set;

DETAILED DESCRIPTION

Briefly, embodiments described herein are directed toward optical or light diffusers (or, simply, "diffusers") that are designed and manufactured to include numerous facets arranged in cells or sets in which the planar faces or outward-facing surfaces have matching orientations and transmission angles (as may be defined by direction cosines of normal to the plane containing each facet surface). The present description is also directed to the method of designing or defining the facets of the diffuser, to methods of manufacturing the diffusers, and to apparatus or products that include or make use of the new diffusers (such as microdisplays, lighting components, and so on). The multi-faceted diffusers or facet diffusers described herein are optically designed to produce a user-specified distribution of light in a single direction or in multiple directions. The diffusers can be engineered through the configuration of the facets on its front or outer surface (light transmission surface) to produce nearly any type of light distribution or shape, and the diffuser design facilitates their manufacture using extrusion processes as well as other fabrication techniques such as cast and cure approaches (e.g., UV or E-beam techniques).

Figure 1:
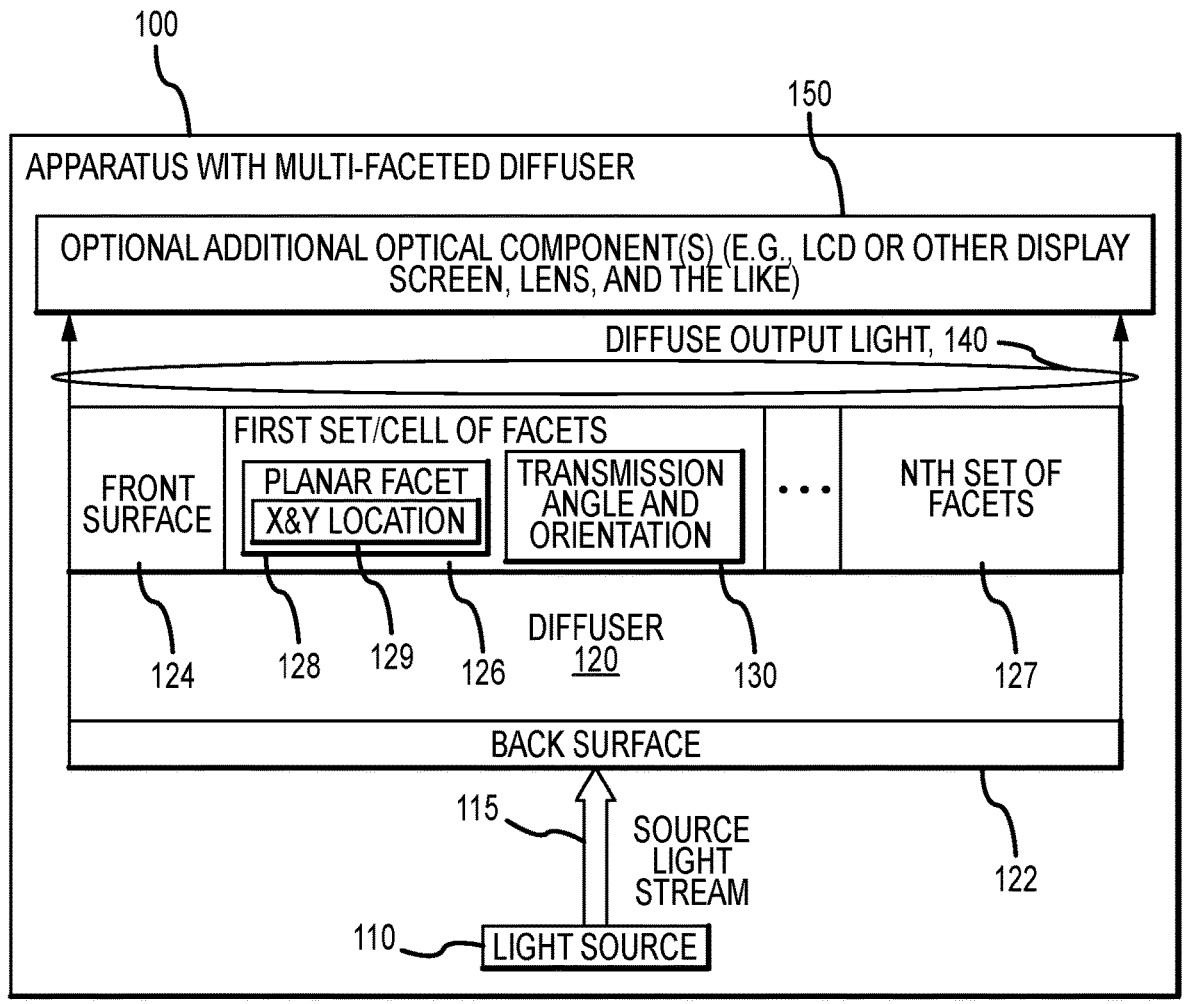
FIG. 1 is a schematic or functional block diagram of an apparatus, such as a microdisplay, a lighting device, or the like, with a "facet" or multi-faceted diffuser of the present description.

FIG. 1 illustrates an apparatus 100 making use of a multi-faceted diffuser design of the present description. The apparatus 100 includes a light source 110 that is operable to produce a light stream 115, which may be of nearly any wavelength and may be coherent when the light source 110 is a laser-based light source or non-coherent when the light source 110 is a filament source, an LED, an arc source, a fiberoptic source, or the like. Many implementations of the light source 110 provide a point or spot stream 115 such that diffusion is desirable to provide an output light 140 in the apparatus 100 that is distributed in space for a desired use such as for backlighting a display screen 150 when the apparatus 100 is a display device.

To this end, the apparatus 100 includes an optical or light diffuser (or "facet" diffuser) 120 that is disposed between the light source 110 and an output of the apparatus 100 (such as between the source 110 and an optional additional optical component 150). The diffuser 120 is formed of a substrate or body (e.g., a film or sheet) of a translucent-to-transparent material (e.g., 50 to 90 percent or more light transmissive material) such as a clear polycarbonate, PET, or the like. The diffuser 120 (or its body/substrate) has a back surface 122, which may be planar, facing the light source 110 for receiving the light stream 115 from the light source 110, and the surface 122 may be arranged to be orthogonal or at another orientation to the directional or travel axis of the stream 115.

Further, and significantly, the diffuser 120 (or its body/substrate) includes a front surface 124 opposite (and typically parallel to) the back surface 122 that is used to scatter and redirect light 115 passing through the diffuser 120 to produce the diffuse output light 140. The front surface 124 is formed so as to include a plurality of sets/cells 126, 127 each with a plurality of facets. This can be seen with exemplary first set or cell of facets 126 each with a planar face/surface 128 at a defined location (e.g., an X-Y coordinate 129 of a center of the face/surface 128) on the front surface 124. Each facet of the set/cell 126 is configured to have a particular orientation and transmission angle 130, which may be defined by the direction cosines of normal to the plane including the face/surface 128. Each set/cell 126 may be adapted or configured to scatter or direct the light transmitted from the front surface 124 in a different manner to provide the diffuse output light 140 such that light 140 has a user-specifiable distribution of light 140 in a single direction or multiple directions.

The apparatus 100 may further include optional additional optical components 150 to allow the apparatus 100 to fulfill different purposes. For example, the optical component 150 may be a LCD or other display screen such that the combination of light source 110 and diffuser 120 act as a backlight for the screen/component 150 with diffuse output light 140. In other cases, the optical component 150 includes a lens and/or optical cover when the apparatus 100 takes the form of a lighting device (e.g., an automobile headlight, taillight, or the like). In other cases, the apparatus 100 may take the form of LED lighting, an LCD/LED display, a projection system, a sign/display, a front projection screen, a mobile phone/smartphone, a barcode scanner, an inspection system, outdoor or indoor lighting, medical instrumentation, fiber optic illumination device, or the like.

Figure 2:
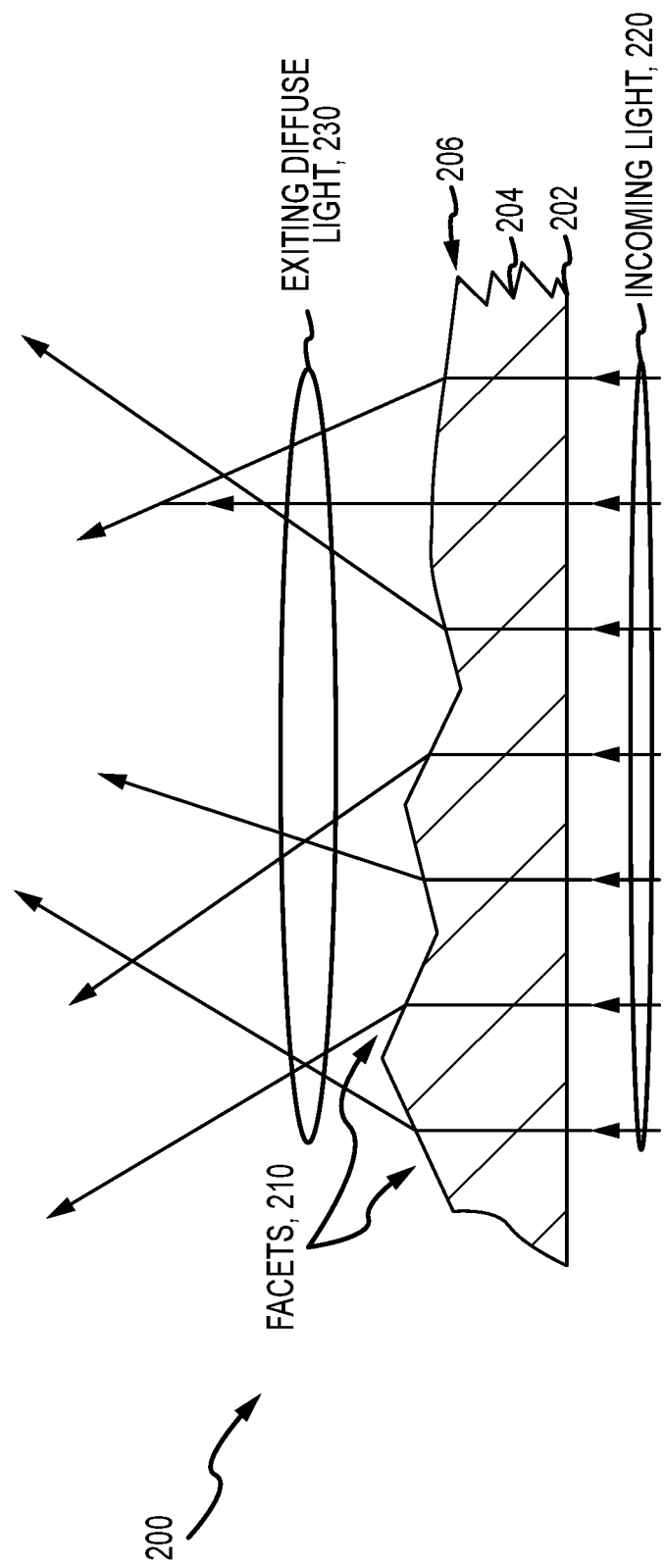
FIG. 2 is a cross-sectional view of an exemplary diffuser of the present description such as may be used in the apparatus of FIG. 1.

FIG. 2 illustrates a cross-sectional and greatly enlarged view of an optical diffuser 200 of the present description such as may be used as the diffuser 120 of the apparatus 100 of FIG. 1. As shown, the diffuser 200 has a body or substrate 204 with a back or first side 202, which may be planar as shown. The back side 202 is exposed to an output of a light source (not shown in FIG. 2 but understood from the light source 110 of FIG. 1) such that it receives incoming light 220 that is illustrated as being composed of numerous parallel rays (or as being non-diffuse light). The body/substrate 204 is formed of material that is highly transmissive of light such as a clear polycarbonate, PET, or other plastic, a glass, a ceramic, or the like that may be 70 to 90 percent transmissive or more (and may be labeled herein as "clear" even though not wholly efficient at transmitting light 220).

The incoming light 220 is received through the back surface 202 and travels basically unimpeded until it reaches the front or second surface 206 of the diffuser 200. The front or second surface 206 is opposite to the back or first surface 202, and it is uniquely formed so as to have numerous facets 210 each uniquely oriented and angled (at a transmission angle) to scatter the light 230 that is transmitted from the front surface 206 to provide diffuse light 230. One ray is shown for each facet 210 for ease of illustration, but, in practice, each will receive and scatter numerous rays of the incoming light 220. As can be seen from the simplified version of a diffuser 200, the facets have different orientations and transmission angles, which may be defined by their direction cosines of normal to the plane containing the face/exterior surface of each facet 210 so as to provide a desired distribution of incoming light 220 in the diffuse exiting light 230 in a single direction or multiple directions and with desired light shaping.

The diffuser 200 achieves the transmission of diffuse light 230 through the inclusion of the small facets 210, which may be rectangular (e.g., square) in shape and substantially planar on their faces/exterior surfaces, with dimensions (e.g., sides) in the range of 6 to 350 microns. A more preferred size for the facets 210 may be 12 to 100 microns (as measured along a side), but some embodiments may use larger or smaller facets. All the facets 210 of a diffuser 200 may have matching sizes and shapes in some embodiments (e.g., all facets 210 may be square in shape with equal side lengths chosen from range of 12 to 30 microns (or another useful range)) while other embodiments may use differently sized facets 210 (within a set or cell or among different sets/cells).

Each facet 210 is defined, as explained below in more detail, during the design and manufacture process by calculating its direction cosines of normal and arranging them at locations about the front surface 206 to produce refraction of parallel incoming light 220 into a desired direction(s). Many such facets 210 would be designed or calculated such as hundreds of thousands to several million depending on the size of the facets 210 and the size of the diffuser 200, and each facet orientation and transmission angle (or direction cosines of normal) is selected to direct light 230 to user-specified areas in space. This selectable distribution of diffuse light 230 allows the user to project images or messages in the space or area illuminated by the diffuse light 230.

The general impact of the new design of the diffuser 200 is quite large and disruptive as it allows one to manufacture highly engineered and refined diffusers at a cost equal to or less than traditional diffusers. Further, the diffuser 200 has shown in simulations to have much higher light transmission efficiencies than conventional diffusers such as 90 percent or greater when compared with less than 50 percent for some conventional diffusers.

Figure 3:
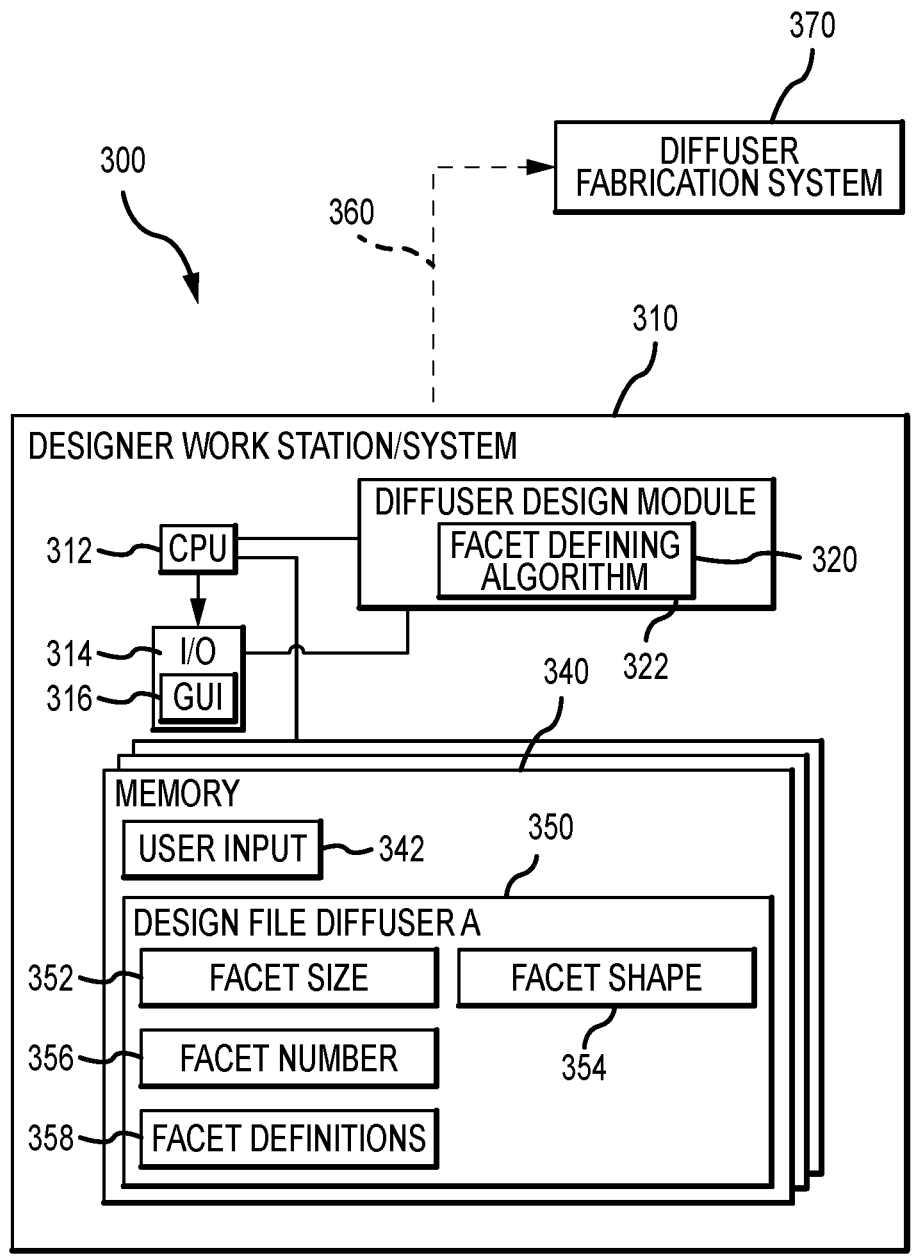
FIG. 3 is a functional block diagram of a system for designing and producing optical diffusers of the present description such as those presented with reference to FIGS. 1 and 2.

FIG. 3 is a functional block diagram of a system 300 for designing and producing optical diffusers of the present description, such as those presented with reference to FIGS. 1 and 2. As shown, the system 300 includes a workstation or computing system 310 that may be used by an operator or designer to design a diffuser to provide a user-specified light distribution. The workstation 310 may be nearly any computing system useful for performing the functions described herein such as a desktop, a laptop, a notebook, a pad, a smartphone, or the like. The workstation 310 includes a processor(s) 312 that processes or executes code, instructions, and/or software to perform or provide the functions described herein of a diffuser design module 320. Particularly, the design module 320 uses a facet defining algorithm 322 to generate definitions of facets for a diffuser to achieve a user-selectable light distribution.

The processor 312 also manages operations of input and output (I/O) devices 314 of the system 310 such as a monitor or display, a keyboard, a mouse, a touchscreen or pad, and so on that allow an operator or designer using the system 310 to input data and to view information presented by the module 320. To this end, the module 320 may be configured to generate a graphical user interface (GUI) 316 that may be displayed on a monitor of the system 310 provided in the I/O devices 314, and an operator may interact with the GUI 316 to provide a set of user input 342 that is stored in memory/data storage 350 of the system 310 by processor 312.

The user input 342 along with other information such as size and shape of a front side or surface of a diffuser, transmissivity of the material used to form the diffuser, and the like is used as input by the facet defining algorithm 322 to generate for diffuser a design file 350 that can be stored in memory 340 by the processor 312. This file 350 is then passed as output as shown with dashed arrow 360 (e.g., by wired or wireless communications) to a diffuser fabrication system 370 such as an extrusion system, a cast and cure system, or the like. The system 370 uses this input file to fabricate diffusers with a front or exterior surface with facets meeting the requirements of the design file 350 for that type of diffuser.

Particularly, each design file 350 may include information including facet shape 354 (such as rectangular, square, or the like), facet size 352 (e.g., 12 microns by 12 microns for a square-shaped facet surface/face), and facet number 356, which may be provided in user input 342 or, more often, is calculated by the module 320 based on the facet size 352 and the size and shape of the diffuser's front or exterior surface so as to substantially cover this surface with facets. Further, each diffuser's design file 350 includes facet definitions 358 generated by the facet design algorithm 322, and these may include a location for each facet (e.g., X-Y coordinates of a center point of the planar face/surface) and its direction of cosines to normal (or orientation and transmission angle of the face/planar surface of the facet).

The inventors created a computer program, to implement the diffuser design module 320 with its facet defining algorithm 322, and this program is adapted to take a designer's (or customer's) design for a diffuser as input. Further, the program allows the designer to program and/or modify their design and to execute them to generate a design file (e.g., file 350 in FIG. 3) that can be used to fabricate diffusers according to the program-generated design (e.g., with definitions of each facet on the front or exterior surface of the diffuser).

At this point in the description, it may be useful to walk through what input (e.g., user input 342 in FIG. 3) the program requests or uses to create a diffuser design and how the designer/user may enter this in some exemplary but not limiting implementations. In one example, the user, when using the program on their computing device, enters data that represents angle locations for each of two angles. The first angle is along the X-axis and the other is along the Y-axis. The user is presented (in a GUI or the like on their monitor or display device) with brightness cells, and the user can enter desired brightness values for each cell (such as in fractions of one or percentages). The program may have some default or hard-coded values for a few diffusers that have been previously designed, and these can be used by the program to automatically fill the brightness cells with these values, which the designer/user may then modify (or accept).

Each cell represents a compound angle at which rays of light will be aimed by the facets of the diffuser being designed. The user input entries can be in fractions of a center cell or the number of rays for the desired direction. The program can automatically calculate the number of rays of input light from the source to go to each cell based on the cell sizes and the overall size of the diffraction substrate (and its exterior or front surface containing the facets). For example, the facets may be sized (by default settings or user input) to have 12-micron square faces/surfaces while the diffuser is defined (again by default or user input) to have a 40,000-micron square area on its front or exterior/transmission surface, and the program would determine that 11,111,111 total facets can be provided on this surface and need to be defined. The program automatically fills the cells in proportion to the user input and total number of facets available. FIG. 4 illustrates a screen shot 400 of the user input page or GUI displayed to the user by the program that shows the number of rays placed in each cell by the program for use in distributing received light from a source from the diffuser's multi-faceted front surface in a user-specified manner.

The computer program is configured to take the user design information and generate each facet normal that will refract rays along the desired paths (associated with the cells to which they are assigned by the program). Significantly, the program is further configured such that the facets are generated in a random location on the front or exterior surface of the diffuser under design. This allows edges of replicated diffusing substrates according to the design to be joined together to form a larger diffuser (e.g., 1 to N diffusers formed according to a diffuser design can be assembled in an abutting manner to form a single diffuser with a light distribution defined by the configuration of each sub-diffuser or substrate). This can be extremely important and unique to this description as the tooling costs of a small facet array (one for a front surface of a small-surface area diffusing substrate or diffuser) can be quite expensive. The random nature of the facet locations allows the smaller diffusers/substrates to be stepped or recombined without creating a "jump" or seam in a fabricated diffuser that would be noticeable in the output diffuse light or output light distribution.

The following is a segment of code that may be used to implement the facet generation subroutine of the computer program (e.g., facet defining algorithm 322 of FIG. 3) along with narrative description of the functionality and output for portions of the code:

```
maxzdc = Cos(MaximumSpecifiedTiltRad)
'set up the unavailable array
For j = -NBCY To NBCY
   For i = -NBCX To NBCX
      nraysneeded(i, j) = BC(i, j)
   Next i
Next j
nrays = 0
nraysold = 0
getout = False
```

```
While getout = False
' assume that the center of the center cell is at polar angles 0,0 or x=y-0
    For j = -NBCY To NBCY ' the cell numbers (locations to be calculated
in the following sub)
        For i = -NBCX To NBCX
            icount = + icount + 1
            If icount > 10000 Then 'check how many rays are available
                If nraysold = ns Then
                    getout = True
                Else
                    getout = False
                End If
                icount = 0#
                nrays = 0#
                For jj = -NBCY To NBCY
                    For ii = -NBCX To NBCX
                        nrays = nrays + nraysneeded(ii, jj)
                    Next ii
                Next jj
                If getout = False Then
                    If nrays > 0 Then
                        getout = False
                    Else
                        getout = True
                    End If
                End If
                nraysold = ns
                Form1.Label(0).Caption = "Generating Facet Normals
Working on Facet Number"+ Str(ns) + " rays available " + Str(nrays)
                DoEvents
            End If
            thetaleftrad = CDbl(i) * BCThetaRadX
            thetabottomrad = CDbl(j) * BCThetaRadY
            If nraysneeded(i, j) >0# Then
                'randomly choose a ray location within the degree band
                'xstarting point on sphere
                xstart = r * Sin(thetaleftrad - BCThetaRadX / 2#)
                ystart = r * Sin(thetabottomrad - BCThetaRadY / 2#)
                xstop = r * Sin(thetaleftrad + BCThetaRadX / 2#)
                ystop = r * Sin(thetabottomrad + BCThetaRadY / 2#)
                xdiff = Abs(xstop - xstart)
                ydiff = Abs(ystop - ystart)
                'use random number generator to pick an x and y in the
spherical ( cell )---
                xrandom = xdiff* Rnd()
                yrandom = ydiff* Rnd()
                xi = xstart + xrandom
                yi = ystart + yrandom
                s2 = xi ^ 2 + yi ^ 2
                If s2 < r Then '
                    zi = Sqr(r ^ 2 - xi ^ 2 - yi ^ 2)
                    s1 = Sqr(xi ^ 2 + yi ^ 2 + zi ^ 2)
                    'cal DC values ( assume that all rays start at 0,0 )
                    e1x = 0#
                    e1y = 0#
                    e1z = 1#
                    e2x = xi / s1
                    e2y = yi / s1
                    e2z = zi / s1
                    s1 = s1
                    'use these values to calculate normals of facets
                    Call facet_normal_finder_and_check(an1, an2, e1x, e1y,
e1z, e2x, e2y, e2z, nx, ny, nz, frsn_true)
                    If frsn_true = True Then
                        If nz > maxzdc Then
                            max_angle = True
                        Else
                            max_angle = False
                        End If 'max angle
                        If max_angle = True Then
                            ns = ns + 1
                            FacetDCX(ns) = nx 'direction cosines of facet
                            FacetDCY(ns) = ny
                            FacetDCZ(ns) = nz
                            nraysneeded(i, j) = nraysneeded(i, j) - 1
                        End If max_angle=t
                    End If frsn_true=t
                End If s2<1
            End If nraysneeded>0#
        Next i
    Next j
Wend
Form1.Label(0).Visible = False
Call Calculate_Maximum_Tilt_Angle
```

Figure 6:
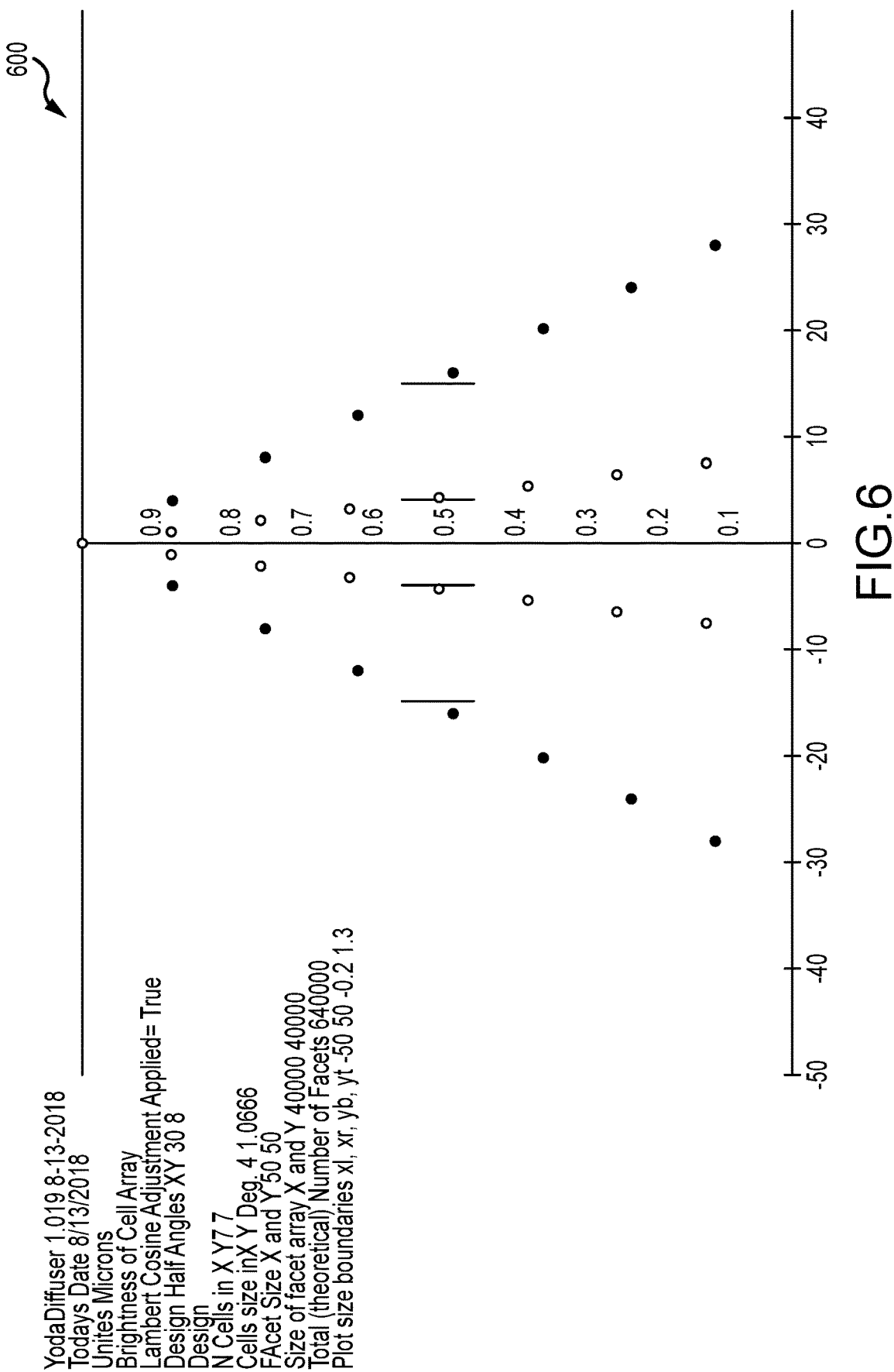
FIG. 6 illustrates a graph or plot plotting out relative brightness versus deflection angle for a designed diffuser such as the one of FIGS. 4-5B
Figure 7:
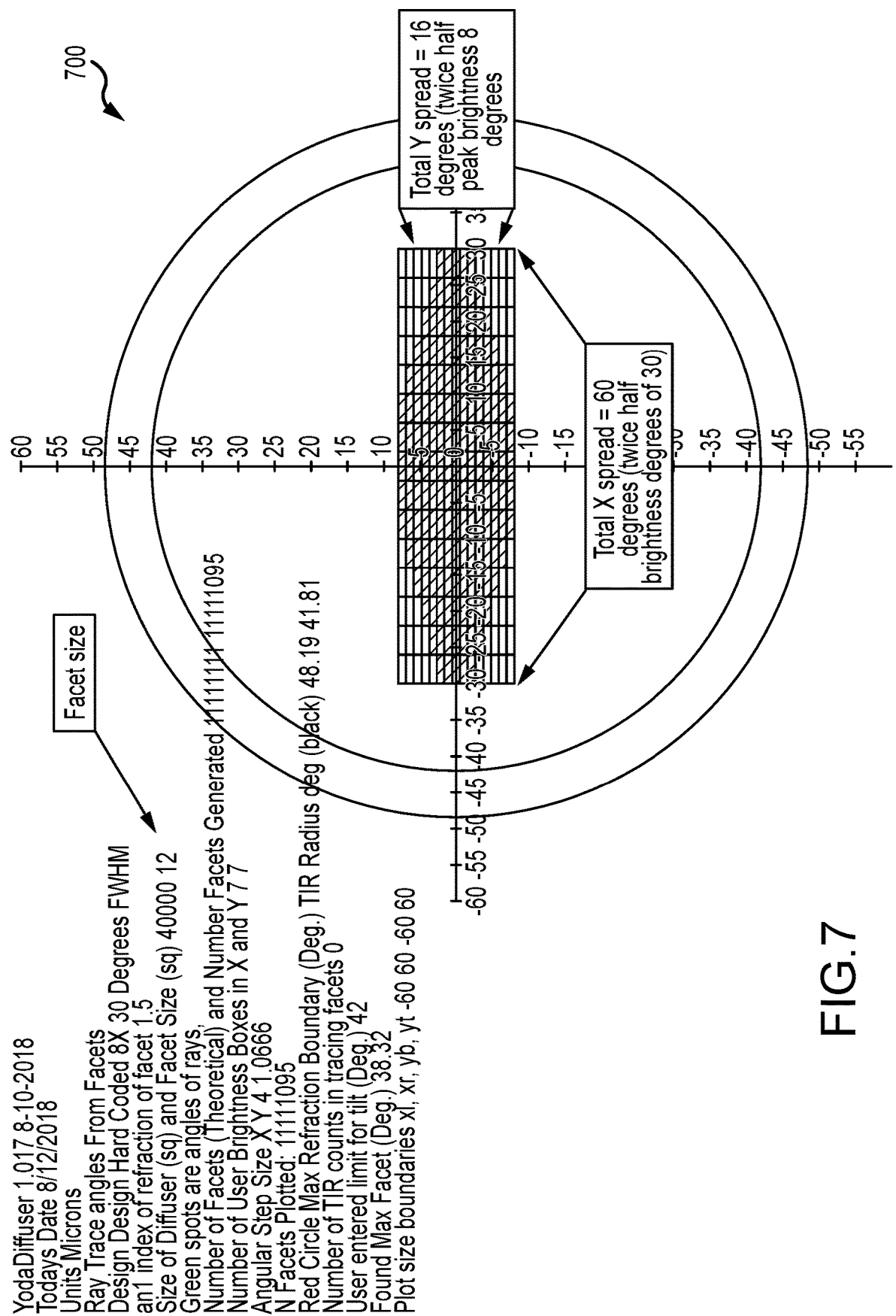
FIG. 7 illustrates a graph or plot showing direction of rays transmitted from a diffuser designed according to the present description such as diffuser of FIG. 4-5B.

The details of the numbers and data used in these calculations can be output to a header file, which may include data as shown in the screen shot 500 of FIGS. 5A and 5B as may be viewed by a diffuser designer on their workstation. This header is also put on top of the vendor file to keep track of the calculation details. The final output file is a very long file containing the direction cosine of each of the 11,111,111 facets in this example. The file is too long to be practical to attach this description. However, FIG. 6 illustrates a graph or plot 600 plotting out relative brightness versus deflection angle for a designed diffuser such as the one of FIGS. 4-5B, and FIG. 7 illustrates a graph or plot 700 showing direction of rays transmitted from a diffuser designed according to the present description such as diffuser of FIGS. 4-5B. In FIG. 7, it can be seen that the total X-directional spread is 60 degrees while total Y-directional spread is 16 degrees.

As will be appreciated from the above discussion of the diffuser design module and its associated algorithms, the inventors' ideas can be implemented using software (and/or firmware) that generates data files. The data files are used by a diffuser designer to create refractive elements or facets on a diffuser surface that send rays of incoming light from a light source(s) in desired directions and at desired intensities, with both being user selectable via user input to the software. The software is configured so that various inputs may be used by the user to define the final output (e.g., a diffuser design file with defined facets), and these may include: (a) facet size; (b) array size (e.g., total final output canvas that may be associated with a diffuser's front/transmission surface); (c) index of refraction for both facet and film on which facet exists (or an indication of which transmissive material is used along with film thickness); (d) angle of light diffusion desired (typically give in degrees); and (e) final product facing direction (facing toward/away from light source).

After these general parameters have been defined (through input or values stored and/or accessed by the program), the program provides a user interface to allow the user to use a "cell"-based system or approach to defining how the brightness of the source light is distributed through the defined angular distribution of light diffusion. In some cases, manually inputting brightness values can be tedious for the user of the program. To address this potential issue, the inventors have added a function to the program that allows the input of data files which contain brightness information for each cell (e.g., a starting or default brightness that can be accepted or modified by the user).

Figure 8:
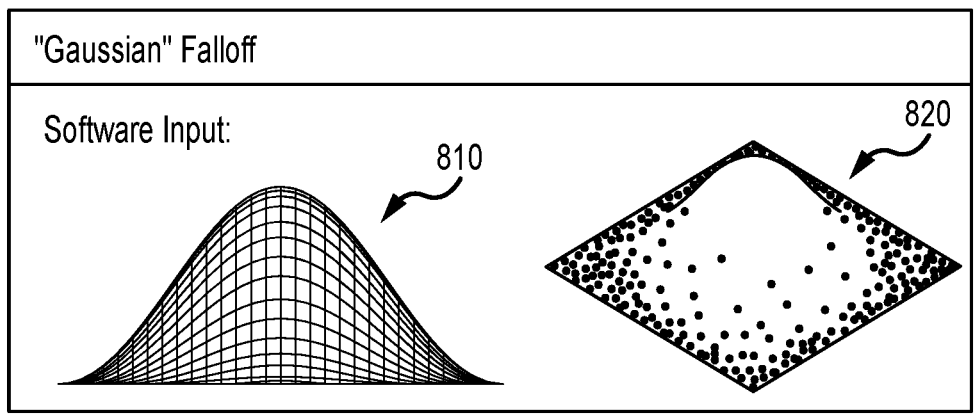
FIG. 8 illustrates an exemplary brightness geometry that may be generated by software described herein and includes an orthographic side view of a brightness curve and an isometric view of the curve with value levels shown with gray values.
Figure 9:
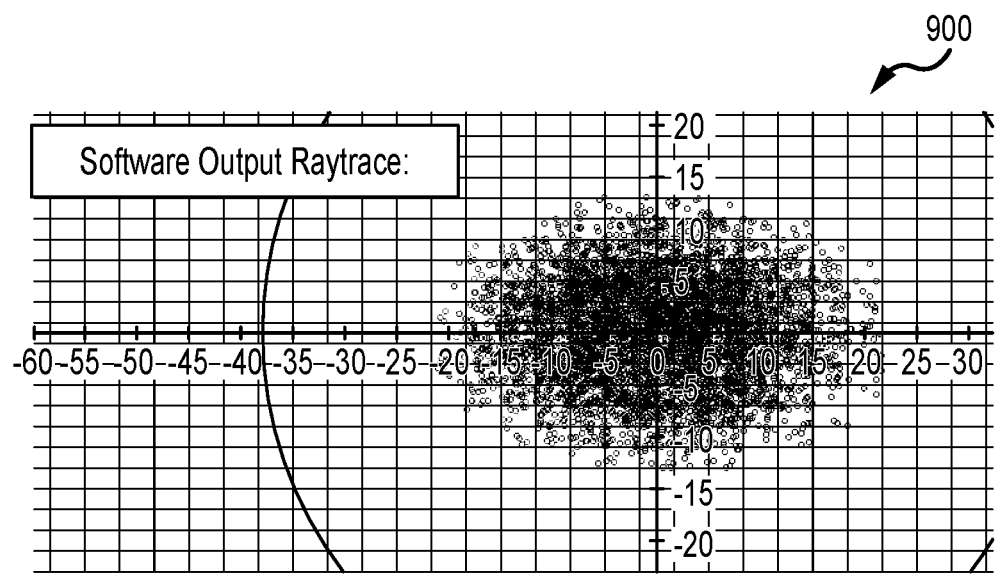
FIG. 9 is a graph showing results of a raytracing for the brightness curves of FIG. 8.

In one particular prototype implementation, the data files used to prefill the cells were generated in 3D software (e.g., AutoDesk® Maya®). FIG. 8 illustrates an exemplary brightness geometry that may be generated by the 3D software, and the brightness may be designated visually by vertex height and gray value. In FIG. 8, representation 810 is an orthographic side view of a brightness curve while representation 820 is an isometric view of the curve with value levels shown with gray values. In summary, a 3D "brightness" curve is generated by the 3D software with points along the curve then being converted to a format that can be read in by the software and used as appropriate brightness values. The inventors further employed a software routine to perform raytracing of designed diffusers, with FIG. 9 showing a graph 900 providing results of a raytracing for the brightness curves 810, 820 of FIG. 8. As can be seen from the graph 900, the ray count softly drops to zero as the angle of light diffusion increases toward user-specified settings.

Once the brightness value file (user input) has been generated and input into the software/design module, the brightness cells are normalized by the software such as to feature a maximum brightness of one. Such a brightness distribution can be seen in the screenshot of the user interface GUI 1000 shown in FIG. 10, which includes a cell chart displaying the brightness values of each cell based on the "Gaussian" curve as seen in FIG. 8. Each cell represents a certain degree range that is based on the final desired distribution angle. Numbers within each cell represent brightness values for that particular degree range. For example, if the diffuser is being designed to have a 30 degree by 30 degree distribution and there are 15 cells, each cell represents a 2 degree by 2 degree region of the final output of diffuse light. Note, in FIG. 10, that the corner cells contain zero facets and, therefore, zero brightness as the intended distribution in this example is ellipsoidal in shape.

If the user/designer finds these brightness values satisfactory, they can instruct the algorithm to continue with adjusting the calculate brightness values to reflect the total number of available facets on the diffuser being designed. The final calculation process converts decimal numbers into whole integers (as it is not likely practical to fabricate fractional facets). The total number of facets is determined by facet size (which may be a default value or be selected from predefined ranges by the user/designer via their user input) and by the overall canvas size (or size of the diffuser front/transmission surface being designed).

FIG. 11 illustrates a screenshot 1100 of a GUI providing brightness distribution of a diffuser under design showing a total number of facets associated with each brightness cell or set (e.g., number of facets assigned to distributing light in the direction and/or location associated with the brightness cell). The numbers contained in each cell reflects the total number of facets that will be assigned to that cell's designated degree range and will be tilted (or oriented) upon manufacture to refract incoming light somewhere within that degree range (with the face/surface of each facet in a cell/set having a like direction cosines of normal).

If these values are deemed satisfactory by the user/designer, the software then proceeds with the algorithm by assigning facets to cells. Each facet assigned to a cell has its tilt angle randomized while still falling within a range acceptable for the cell so as to allow for a smooth distribution of light. However, some embodiments may have all facets for a single cell pointing at the direct middle angular value for the cell, but, in some cases, this may result in hot spots for each cell degree range (which may not be suited for many light distribution applications). Further, the algorithm is configured such that the assignment of facets across the face/surface of the diffuser is random and is not determined by facet location or cell angle. This random distribution of the facets to the cells/sets combined with the microscopic facet size has been proven by the inventors to produce diffusers that refract light being transmitted through the diffuser in an appropriate manner to achieve a particular distribution regardless of where the incoming light from the light source contacts the back surface of the diffuser and, thus, the facet array on the front or transmission surface of the diffuser.

Once the software has assigned all facets that are available to a cell/set, the software outputs a text file (diffuser design file) containing X-Y coordinate data as well as dX/dY/dZ tilt (or orientation) data for each facet. This text file can then be used to manufacture a diffuser with a surface having such cells or sets of facets that can be provided in an optical apparatus to provide user-defined distribution of light from a light source. For example, the text file may be used to create planar array precision tooling into a master (which may be a glass master or the like), and this master may be used to grow or form shims (e.g., nickel shims or the like). The shims may then be used to make transparent castings such as through the use of UV curable fluid, and the quality of the final castings (e.g., the diffusers) match the initial tooling exactly or at least with very high precision. Hence, shining a light through these transparent or semi-transparent castings results in the initial brightness distributions input to the software by the user/designer (such as via the cell GUI shown above).

Figure 12:
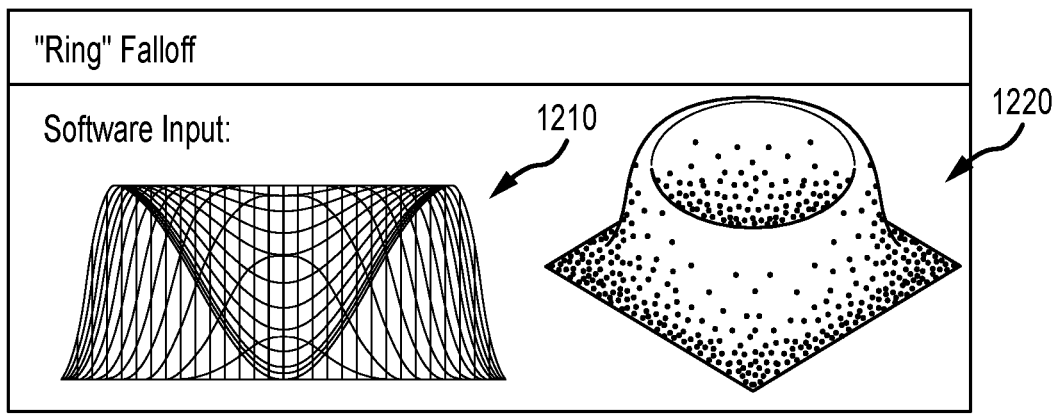
FIG. 12 illustrates a second exemplary brightness geometry that may be generated by software described herein and includes an orthographic side view of a brightness curve and an isometric view of the curve with value levels shown with gray values.
Figure 13:
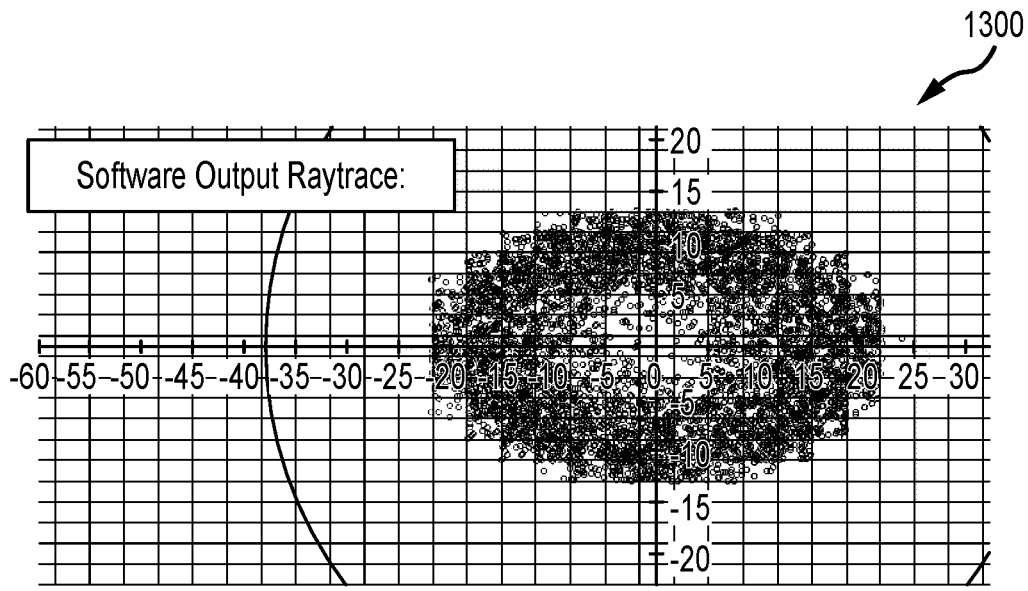
FIG. 13 is a graph showing results of a raytracing for the brightness curves of FIG. 12.

As will be appreciated, the above techniques can be used to generate light distributions with a diffuser to suit nearly any user's needs and is not limited to the geometry shown in FIGS. 8 and 9. As one example, FIG. 12 illustrates an exemplary brightness geometry that may be generated by the 3D software, and the brightness may be designated visually by vertex height and gray value. In FIG. 12, representation 1210 is an orthographic side view of a brightness curve while representation 1220 is an isometric view of the curve with value levels shown with gray values. The input curves are useful for generating a light distribution with a "ring" brightness falloff. FIG. 13 shows a graph 1300 providing results of a raytracing for the brightness curves 1210, 1220 of FIG. 12.

At this point in the description, it may be useful to provide additional details on the algorithm(s) carried out by the software/computer program used to design diffusers along with some of the mathematical challenges addressed and overcome by the inventors. First, the inventors understood that most present-day diffusers are holographic or utilize lens structures. In the present case, the goal was to be able to create Gaussian and non-Gaussian diffusers that were generated (defined) in software and that could be tooled quickly and effectively. It was also a goal that these types of diffusers would be designed and fabricated such that they would work (e.g., properly diffuse light per a designer's input) regardless of the area the incoming light from a light source (e.g., an LED, a laser-based light source, and so on) moves through the diffuser in a transmission mode (as well as reflected when desired) such that a light source does not have to be accurately aligned with a center of the diffuser or be stationary behind the diffuser. As will be appreciated by those in the optics and light transmission arts, the transmission mode for the new diffusers proved to be extremely challenging.

In order to create the new front/transmission surface of the diffusers with such goals in mind, it was determined by the inventors that the structures or facets should be randomized in their location on the front/transmission surface. Randomized location of sets or cells of facets directing light in certain directions (e.g., degree ranges as discussed above) is useful so that regardless of whether one is using a laser or an LED light the same shape of the light would occur (or distribution) (e.g., a particular input stream is not required for the new diffuser design). This also requires random structures within a subset of structures (e.g., within each brightness cell or set of facets assigned to provide a particular redirection of incoming light). Because of this, smaller tooling could be made (or fabricated diffusers with such smaller tooling) and then put together in a step-and-repeat environment even by overlapping structures without having resulting visible jumps in the light as the light source moves across the structures. The advantage of facet-based structures that can be programmed at any angle in just moments was dramatic and unexpected. For example, programming and tooling for a diffuser design according to this description is relatively fast. Further, the new diffuser design allows replacement of prior holographic-type diffusers, and holographic masters, which can be expensive and difficult create, do not have to be shot or used.

The challenge and one unique aspect of the invention is that the mathematics to solve this problem were found to be unusual and unconventional. The following discussion describes some of the contributions provided by the inventors (or accomplishments) as well as the base logic behind the algorithm carried out by the software/computer program described herein. Normally Snell's law can be used when the normal vector to a surface is known. In this case, the normal vector to a facet's planar surface/face is not known to find the refraction of the ray to a desired location. In other words, Snell's law had to be re-written by the inventors mathematically to give the starting ray a refractive surface to find the surface normal that will refract the ray to a desired location.

In order to do this, the inventors rewrote or modified Snell's law in a vector formulation. This rewrite required that the cross product of two vectors form a third vector to hit the desired location of the ray. In the mathematics of the rewrite, the sine of the angle between the two vectors is proportional to the cross product. During initial efforts by the inventors, it appeared there might not be a solution to create an equation (or several equations that could be solved as part of the software (or its algorithm). In this case, it was surmised that the software could be configured to calculate an optimized solution without a firm solution, and, it should be understood that the present description encompasses software that uses such an optimized solution to finding and defining the normal vectors to each facet.

However, it was discovered, in time and through significant efforts by the inventors, that the equation(s) could be solved, and a more preferred embodiment to the algorithm carried out by the software (or diffuser design module/program) involves creating a cross product in a normalized format in which the sine of the angle between the two vectors is proportionate. By solving the equation(s), the diffuser can be designed to contain a very large number (hundreds of thousands to millions) of carefully oriented facets to bend/direct light into any shape or light distribution desired (even letters or symbols) with high efficiency. Importantly, incoming light need not be collimated, it can be input as any incoming vector (or even average of the incoming light vector) and still be refracted/redirected to the desired location by the facets on the front/transmission surface of the diffuser. In the past, this had proven to be extremely difficult if not impossible for most diffusion systems.

As noted above, the facets defined for a diffuser may vary in shape (e.g., round, square, rectangular, hexagonal, or the like) and size, with common dimensions (such as sides of a rectangular (and square in some embodiments)) being in the range of about 6 to 8μ to 350μ or more in some cases. With a size, shape, and number (based on size and shape of facets and of front/transmission surface of diffuser) of facets defined, the facet defining algorithm uses random selection of the facets for assignment to a brightness beam/set (which may be associated with a particular range of distribution angles of the overall defined light distribution), and the algorithm further uses random assignment of transmission angles within this cell and its distribution angle range (or within a predetermined region) to avoid hotspots (e.g., not every or even any of the facets will be targeted at center of predetermined region).

The light distribution can be defined by user input to achieve nearly any desired light distribution such as for creating a line focus or an engineered diffusion to eliminate hot spots (such as may happen when using LED lights as light sources without use of the present invention). Further, the light distribution may be defined as engineered shapes such as letters or images, and the facets are defined to provide light distributions to present these shapes in space a distance away from the front/transmission surface of the diffuser. Further, the user input may define a direction and/or location of an incoming light stream from a light source, and the algorithm (or diffuser design module) may be configured to manipulate or respond to the direction of the incoming light for a solution to the diffuser needs as part of defining the facets for desired light distribution. The program further can be configured to provide the ability to manipulate the facets by changing (via user input or the like) the refractive index of the materials in the program (e.g., one parameter set by the user input may be a diffuser material and/or a refractive index for the substrate/film to be used in forming the diffuser).

The new diffusers may be used with a wide variety of light sources such as LED, fluorescent, laser and halogen lighting or light sources. In one particular implementation, the apparatus with a light diffuser described herein is implemented with an LED light source and is configured for use as or in LED lighting curing units for proper light distribution of curing energy cured inks and coatings for the printing and converting industry. The apparatus in other implementations are used in or to provide projection screens. In other cases, the apparatus includes the new diffusers to provide theater lighting or lighting for film production. In still other examples of useful apparatus with the new diffusers, the apparatus taught herein may take the form of a microdisplay or screen (e.g., an LED screen) of all types (e.g., displays or screens for a PDA, a TV, a smartphone or cellphone, computing devices such as pads, tablets, and the like, or other electronic device with a display or screen). In still other use cases, the new apparatus uses the diffusers for light diffusion in automobile headlights, taillights, and interiors. Other apparatus may include and use the new diffusers for indoor and outdoor lighting applications.

The file defining the diffuser's facets can be used (e.g., to create tooling) for a variety of manufacturing processes. For example, the design file output by the software described herein can be used in a method of manufacture of the diffusers in extrusion processes as well as in a method of manufacture in cast and cure (UV or E Beam) curing of the facets. Further, the design file may be used as input for a method to create larger tooling and seamless tooling due to the use of the random selection processed taught herein.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the light receiving surface of the diffuser (e.g., a back surface which faces the light source) may be configured to include the facets while the front surface may be planar. This reverse orientation compared to that described above is not shown in the figures, but it will be readily understood by those skilled in the arts.

As discussed above, the diffuser and its facets will often be configured for diffusing light of various wave lengths. For example, the facets may be engineered to provide the predefined light distribution (particular scattering or diffusing of light) for white light as well as specific ranges of wavelengths for various applications such as IR, lower wave lengths, and the like. In the same or other examples, the design programming can be done for touchless screens and so forth. In other words, the diffusers can be made to work at very specific wavelengths as taught herein and understood by ready extension by those skilled in the arts.

In some embodiments, the diffusers are configured as metallized reflective diffusers, and a thin film or layer of reflective metal is provided upon the planar surface of the diffuser and the output light from the light source first passes through the surface containing the facets prior to reflection with light scattering as described herein. The diffusers described herein may be manufactured in a number of ways as discussed above and further including via molded glass and injection molded plastics processes.

We claim:

1. An apparatus for producing a predefined light distribution in space, comprising:
   a light source operable to output light; and
   a diffuser with a substrate having a back surface receiving the light output from the light source and a front surface, opposite the back surface, redirecting and transmitting the light received on the back surface to output diffuse light with the predefined light distribution from the diffuser,
   wherein the substrate is formed of a light-transmissive material,
   wherein the front surface comprises a plurality of facets providing the diffusing of the light,
   wherein each of the plurality of facets is randomly assigned to one of a plurality of sets, and
   wherein each of the plurality of sets is associated with a region of the predefined light distribution.

2. The apparatus of claim 1, wherein each of the facets in each of the plurality of sets has a planar face oriented to redirect the light received on the back surface in a direction within the region of the predefined light distribution associated the one of the plurality of sets to which they are assigned.

3. The apparatus of claim 2, wherein each of the regions of the predefined light distribution is associated with an angular range and wherein the direction within the region is randomly assigned to each of the facets.

4. The apparatus of claim 2, wherein each of the facets is defined by coordinates of the planar face on the front surface of the diffuser and by a normal vector direction to the planar face.

5. The apparatus of claim 1, wherein each of the sets of the facets is associated with a brightness cell defining the predefined light distribution and wherein a number of the facets assigned to each of the sets of the facets is selected based on a brightness values assigned to each of the brightness cells.

6. The apparatus of claim 1, wherein the predefined light distribution is a Gaussian distribution.

7. The apparatus of claim 1, wherein the predefined light distribution is a line focus, is an engineered shape, includes one or more letters, or includes one or more images.

8. The apparatus of claim 1, wherein the light source is a light emitting diode (LED) source, an infrared (IR), a white light source, a coherent light source, a filament light source, a fluorescent light source, or a halogen light source.

9. The apparatus of claim 1, further comprising at least one additional optical element positioned to receive the output diffuse light and wherein the apparatus is one of a display, a projection screen, theater or film production lighting, automobile lighting, indoor or outdoor lighting, and a light curing unit.

10. The apparatus of claim 1, wherein the diffuser is formed via extrusion processes, cast and cure using ultraviolet (UV) or E beam curing of the facets, molded glass process, or injection molded plastics processes.

11. The apparatus of claim 1, wherein each of the facets has a planar face that has a circular, a rectangular, a square, or a hexagonal shape and has a maximum outer dimension in the range of 6 to 350 microns.

12. The apparatus of claim 11, wherein each of the facets is engineered for a specific wavelength of light that falls within a predefined range.

13. The apparatus of claim 12, wherein the light associated with the specific wavelength is white light, is IR light, or lower-wave length light and wherein the apparatus is a touchscreen or a touchless screen.

14. An optical diffuser, comprising:
   a body formed of a material that has a light transmission efficiency of at least 50 percent;
   a planar back surface on the body for receiving output light from a light source; and
   a front surface, opposite the planar back surface on the body, scattering and transmitting the output light received on the back surface to provide diffuse light with a predefined light distribution,
   wherein the front surface comprises a plurality of facets each having a planar face with a maximum outer dimension in the range of 6 to 350 microns,
   wherein each of the plurality of facets is randomly assigned to one of a plurality of sets,
   wherein each of the plurality of sets is associated with a region of the predefined light distribution,
   wherein a brightness value is assigned to each of the sets, and
   wherein a subset of the plurality of facets assigned to each of the sets is sized in number based on the brightness value of the set.

15. The optical diffuser of claim 14, wherein each of the planar faces of the facets assigned to each of the sets is oriented to redirect the light received on the back surface in a direction within the region of the predefined light distribution associated the one of the plurality of sets to which they are assigned, wherein each of the regions of the predefined light distribution is associated with an angular range, and wherein the direction within the region is randomly assigned to each of the facets.

16. The optical diffuser of claim 14, wherein each of the facets is defined by coordinates of the planar face on the front surface of the diffuser and by a normal vector direction to the planar face.

17. The optical diffuser of claim 14, wherein the predefined light distribution is a Gaussian distribution.

18. The optical diffuser of claim 14, wherein the predefined light distribution is a line focus, is an engineered shape, includes one or more letters, or includes one or more images.

19. The optical diffuser of claim 14, wherein the diffuser is formed via extrusion processes, cast and cure using ultraviolet (UV) or E beam curing of the facets, molded glass process, or injection molded plastics processes.

20. An apparatus for producing a predefined light distribution in space, comprising:
a diffuser with a substrate having a back surface for receiving light output from a light source and a front surface, opposite the back surface, redirecting and transmitting the light received on the back surface to output diffuse light with the predefined light distribution from the diffuser,
wherein the substrate is formed of a light-transmissive material,
wherein the front surface comprises a plurality of facets providing the diffusing of the light,
wherein each of the plurality of facets is randomly assigned to one of a plurality of sets,
wherein each of the plurality of sets is associated with a region of the predefined light distribution,
wherein each of the sets of the facets is associated with a brightness cell defining the predefined light distribution, and
wherein a number of the facets assigned to each of the sets of the facets is selected based on a brightness values assigned to each of the brightness cells.

21. The apparatus of claim 20, wherein each of the facets in each of the plurality of sets has a planar face oriented to redirect the light received on the back surface in a direction within the region of the predefined light distribution associated the one of the plurality of sets to which they are assigned, wherein each of the regions of the predefined light distribution is associated with an angular range, and wherein the direction within the region is randomly assigned to each of the facets.

22. The apparatus of claim 20, wherein the predefined light distribution is a Gaussian distribution.

23. The apparatus of claim 20, wherein the predefined light distribution is a line focus, is an engineered shape, includes one or more letters, or includes one or more images.

24. The apparatus of claim 20, wherein the diffuser is formed via extrusion processes, cast and cure using ultraviolet (UV) or E beam curing of the facets, molded glass process, or injection molded plastics processes.

25. The apparatus of claim 20, wherein each of the facets has a planar face that has a circular, a rectangular, a square, or a hexagonal shape and has a maximum outer dimension in the range of 6 to 350 microns and wherein each of the facets is engineered for a specific wavelength of light that falls within a predefined range.

26. An apparatus for producing a predefined light distribution in space, comprising:
a light source operable to output light; and
a diffuser with a substrate having a back surface receiving the light output from the light source and a front surface, opposite the back surface, redirecting and transmitting the light received on the back surface to output diffuse light with the predefined light distribution from the diffuser,
wherein the front surface comprises a plurality of facets providing the diffusing of the light,
wherein each of the plurality of facets is assigned to one of a plurality of sets,
wherein each of the plurality of sets is associated with a region of the predefined light distribution, and
wherein each of the facets in each of the plurality of sets has a planar face oriented to redirect the light received on the back surface in a direction within the region of the predefined light distribution associated the one of the plurality of sets to which they are assigned.

27. The apparatus of claim 26, wherein each of the regions of the predefined light distribution is associated with an angular range and wherein the direction within the region is randomly assigned to each of the facets.

28. The apparatus of claim 26, wherein the light source is a light emitting diode (LED) source, an infrared (IR), a white light source, a coherent light source, a filament light source, a fluorescent light source, or a halogen light source.

29. The apparatus of claim 26, further comprising at least one additional optical element positioned to receive the output diffuse light and wherein the apparatus is one of a display, a projection screen, theater or film production lighting, automobile lighting, indoor or outdoor lighting, and a light curing unit.

30. The apparatus of claim 26, wherein each of the facets has a planar face that has a circular, a rectangular, a square, or a hexagonal shape and has a maximum outer dimension in the range of 6 to 350 microns.

31. An optical diffuser, comprising:
a body formed of a material that has a light transmission efficiency of at least 50 percent;
a planar back surface on the body for receiving output light from a light source; and
a front surface, opposite the planar back surface on the body, scattering and transmitting the output light received on the back surface to provide diffuse light with a predefined light distribution,
wherein the front surface comprises a plurality of facets each having a planar face,
wherein each of the plurality of facets is assigned to one of a plurality of sets,
wherein each of the plurality of sets is associated with a region of the predefined light distribution,
wherein a brightness value is assigned to each of the sets, and
wherein a subset of the plurality of facets assigned to each of the sets is sized in number based on the brightness value of the set.

32. The optical diffuser of claim 31, wherein each of the planar faces of the facets assigned to each of the sets is oriented to redirect the light received on the back surface in a direction within the region of the predefined light distribution associated the one of the plurality of sets to which they are assigned, wherein each of the regions of the predefined light distribution is associated with an angular range, wherein the direction within the region is randomly assigned to each of the facets, and wherein the predefined light distribution is a Gaussian distribution.

* * * * *